United States Patent [19]

Kernstock

[11] 4,415,683

[45] Nov. 15, 1983

[54] HYDROXYETHYL HYDROXYPROPYL CELLULOSE ETHER THICKENERS FOR AQUEOUS COATING COMPOSITIONS

[75] Inventor: John M. Kernstock, Midland, Mich.

[73] Assignee: The Dow Chemical Company, Midland, Mich.

[21] Appl. No.: 362,228

[22] Filed: Mar. 26, 1982

[51] Int. Cl.³ .......................... C08L 1/26; C08L 1/28
[52] U.S. Cl. ...................................... 524/43; 524/44; 106/14.34; 106/170; 106/197 R
[58] Field of Search ................. 524/27, 42, 43, 44; 106/14.34, 26, 169, 170, 181, 197 R, 288 R

[56] References Cited

U.S. PATENT DOCUMENTS

| | | | |
|---|---|---|---|
| 3,388,082 | 6/1968 | Rodgers, Jr. et al. | 260/17 |
| 3,652,313 | 3/1972 | Nagata et al. | 106/197 R |
| 3,709,876 | 1/1973 | Glomski et al. | 260/231 A |
| 3,741,922 | 6/1973 | Glomski et al. | 260/17 R |
| 3,749,710 | 7/1973 | Koyanagi et al. | 260/231 A |
| 3,769,247 | 10/1973 | Glomski et al. | 260/17 R |
| 3,873,518 | 3/1975 | Strange et al. | 260/231 A |

FOREIGN PATENT DOCUMENTS 801731 12/1968 Canada .
50-26888 3/1975 Japan .

*Primary Examiner*—John Kight, III
*Assistant Examiner*—Nathan M. Nutter

[57] ABSTRACT

Aqueous coating compositions are disclosed employing as a thickener an HEHPC ether having a haze point of at least about 70° C., a gel point below 100° C., a total molar substitution of about 2.5 to about 4.0 and having a ratio of hydroxypropyl molar substitution to hydroxyethyl molar substitution of about 1:2 to 2:1. The HEHPC thickeners as described exhibit good resistance to bacterial degradation, good color development and a haze point sufficiently high to allow normal formulation of the coating composition.

10 Claims, No Drawings ent No. 50-26888/1975. According to the process
HYDROXYETHYL HYDROXYPROPYL CELLULOSE ETHER THICKENERS FOR AQUEOUS COATING COMPOSITIONS

BACKGROUND OF THE INVENTION

This invention relates to novel hydroxyethyl hydroxypropyl cellulose ether thickeners for aqueous coating compositions.

Water-soluble cellulose ethers have long been employed in aqueous coating compositions as thickeners and protective colloids. Ideally, cellulose ethers employed in said aqueous coating compositions must provide good flow and brush out, good color development and high resistance to bacterial degradation. Moreover, it is highly preferred that the cellulose ethers have a haze point such that the cellulose ethers remain soluble at the high temperatures (i.e., 50°–90° C.) produced in the commercial formulation of said aqueous coating compositions yet have a gel point below 100° C. so that the cellulose ethers can be purified inexpensively by using aqueous media. Cellulose ethers previously employed as thickeners in latex coating compositions generally do not exhibit the desired combination of good color development, high resistance to bacterial degradation and high haze point.

For example, hydroxyethyl cellulose ethers exhibit good color development but low resistance to bacterial degradation. See, for example, Lindenfors, Acta Chemica Scand. 16,111 (1962). Hydroxypropyl methylcellulose ethers exhibit improved resistance to bacterial degradation yet exhibit poor color development, i.e., they cause significant agglomeration or flocculation of the pigments, thereby causing the loss of pigment effectiveness. Hydroxyethyl hydroxypropyl methylcellulose ethers often have a haze point which is too low to permit normal formulation of the coating composition, and are relatively expensive to produce due to the formation of undesirable by-products.

Thus, a cellulose ether which combines the desired characteristics of good color development, high 1 resistance to bacterial degradation and high haze point is highly desirable for use in aqueous coating compositions.

SUMMARY OF THE INVENTION

The present invention is an aqueous coating composition comprising (1) an aqueous dispersion of finely divided, water-insoluble polymer particles, (2) a pigment and (3) a water-soluble hydroxyethyl hydroxypropyl cellulose having a thermal haze point of at least about 70° C., a gel point below 100° C., a total molar substitution of from about 2.5 to 4.0 and a ratio of hydroxypropyl molar substitution to hydroxyethyl molar substitution (HPMS/HEMS) of about 1:2 to 2:1. The hydroxyethyl hydroxypropyl cellulose ether is employed in an amount sufficient to impart the desired viscosity to the coating composition. The thickeners of this invention exhibit an improved combination of the properties of (4) resistance to bacterial degradation, (2) color development and (3) haze point as compared to conventional cellulosic thickeners. The aqueous coating compositions of this invention can be beneficially employed as paint formulations, protective coatings and the like.

DETAILED DESCRIPTION OF THE INVENTION

The aqueous coating compositions of this invention employ as a thickener a hydroxyethyl hydroxypropyl cellulose ether (HEHPC) having a haze point of at least about 70° C., a gel point below 100° C., a total molar substitution (MS) of about 2.5 to about 4.0 and a ratio of hydroxypropyl molar sustitution to hydroxyethyl molar substitution (HPMS/HEMS) of about 0.5 to 2.0. Preferably, the total molar substitution is about 3.5 and the HPMS/HEMS ratio is less than 1.0. Although not critical, the hydroxyethyl hydroxypropyl cellulose ethers preferably have a viscosity as a 2 percent aqueous solution at 20° C. of about 50 to 250,000 cps, more preferably from about 4,000 to 50,000 cps.

"Molar substitution" refers to the average number of moles of the reactants combined with the cellulose per anhydroglucose unit. Although there are three hydroxyl groups in each anhydroglucose unit in the cellulose molecule, the total molar substitution can exceed three because each time a hydroxyalkyl group is introduced onto the cellulose molecule, an additional hydroxyl group is formed which itself is capable of being hydroxyalkylated. Thus, polyether side chains can be formed, increasing the total molar substitution of the molecule.

The terms "haze point" and "gel point" describe the solubility of cellulose ethers at elevated temperatures. HEHPC ethers, while soluble in water at ambient temperatures, become insoluble as the solution temperature rises. Thus, as the temperature of a cellulose ether solution rises, the solution will become cloudy, and gels, lumps or granules will appear. The temperature at which the solution becomes cloudy is the haze point of the cellulose ether. The temperature at which gels and the like form in the solution is the gel point. In general, the haze and gel points of a cellulose ether are determined by heating a solution containing 2 percent by weight of the cellulose ether. A method for determining haze and gel points is described in the example hereinafter.

The HEHPC is advantageously prepared by reacting ethyl oxide and propylene oxide with alkali cellulose at about 40° to 90° C. Alkali cellulose is prepared by treating cellulose with about 1.2 to 3.0 moles of 35 to 75 percent aqueous sodium hydroxide per mole of cellulose at room temperature. A dip tank as described in U.S. Pat. No. 2,949,452 to Savage, a spray mixer as described in U.S. Pat. No. 2,469,764 to Erickson or a slurry reactor as described in U.S. Pat. No. 2,131,733 to Haskins are all suitable reactors. The reaction can be advantageously carried out in a slurry with an organic diluent such as t-butanol or methyl ethyl ketone or in the vapor phase in the absence of a reaction medium. In a vapor phase reaction, alkali cellulose is contacted with ethylene oxide and propylene oxide in the absence of a liquid diluent and under a nitrogen atmosphere. Such vapor phase reaction may be conducted according to the procedure described in Japanese Patent Announcement No. 50-26888/1975. According to the process described in said Japanese Patent Announcement, the vapor phase reaction may be conducted in a vertically agitated, horizontally agitated or horizontally rotated vessel. Care is taken to remove the heat of reaction from the vessel as it is formed. Advantageously, the heat of reaction is controlled by continuously adding small amounts of the reactants to the vessel. The vapor phase reaction of ethylene oxide can be conducted at a temperature of about 25°–45° C. and the propylene oxide reaction can be conducted at about 40°–60° C. Reaction time can be from 4–12 hours, and it is sometimes advantageous to allow the reactions to ripen for an hour or more at 80° C.

More generally, the reaction is advantageously carried out in a pressure reactor in the absence of air. Because of the greater reactivity of ethylene oxide, the reactor is advantageously charged with most or all of the propylene oxide and only part of the ethylene oxide and heated to the reaction temperature. The remaining ethylene oxide is then added to the reactor over a period of about 15 minutes to 2 hours at a rate such that the reaction is maintained at a desired temperature. Control of the exothermic portion of the reaction is important to minimize irregular and uneven substitution. Although the degree of substitution is not critical to this invention, it is well-known that resistance to bacterial degradation is improved by increasing the degree of substitution and by increasing the uniformity of substitution on the cellulose molecule. A temperature of about 40° to 60° C. is preferably maintained for the exothermic portion of the reaction, preferably by employing an external cooling means and/or use of an embullient diluent to moderate the rate of etherification. Following completion of the exothermic portion of the reaction, the reaction can be finished at 55° to 90° C. After the exothermic etherification is complete, excess caustic can be, if desired, neutralized until only catalytic amounts of caustic, i.e., from about 0.5 to 1.5 parts by weight caustic per part cellulose remain in the reaction mixture. The reaction can then be maintained at 55° to 90° C. until the desired degree of etherification is achieved.

The ratio of hydroxypropyl substitution to hydroxyethyl substitution is controlled by moles of reactants employed, the sequence of addition of said reactants to the reaction mixture and the amount of time in which the reaction is run. A high HPMS/HEMS ratio is favored by adding the propylene oxide prior to the addition to the ethylene oxide, by employing greater molar quantities of propylene oxide than ethylene oxide and by increasing the time of reaction.

Since the HEHPC ethers suitably employed in this invention have gel points below 100° C., byproducts and impurities are readily removed by washing with hot water and aqueous salt solutions. After purification, the product HEHPC can be dried, granulated, ground, surface-treated or otherwise prepared for storage or end use.

The thickeners of the present invention are useful with all aqueous dispersions of finely divided water-insoluble polymer particles. These dispersions include typically the aqueous emulsion polymerizates (often called latexes) of ethylenically unsaturated monomers such as styrene and other monovinylidene aromatic monomers with butadiene and other open chain aliphatic conjugated dienes having from 4 to 9 carbon atoms; acrylic monomers including alkyl acrylates such as ethyl-, butyl- and octyl-acrylate and the alkyl alkacrylates such as methyl methacrylate; chloroethylenic monomers such as vinyl chloride and vinylidene chloride; and vinyl alkanoates such as vinyl acetate and vinyl propionate. The operable latexes would include the various homopolymers and interpolymers of the above monomers with each other and with other known ethylenically unsaturated monomers, as well as any of those latexes and artificial latexes described in U.S. application Ser. No. 219,480, filed Dec. 23, 1980. The latexes may also be blends of two or more such latexes.

Any pigment beneficially employed in aqueous coating compositions can be used in the coating compositions of this invention. Exemplary pigments include inorganic pigments such as titanium dioxide as well as organic pigments such as carbon black, copper pthalocyanine, quinacidone red, quinacidone violet, among others.

Sufficient amounts of the hydroxyethyl hydroxypropyl cellulose ethers are employed to impart the desired viscosity to the coating composition. Advantageously, the hydroxyethyl hydroxypropyl cellulose ethers thickeners are advantageously employed in an amount ranging from about 0.1 to 3 weight percent based on the total weight of the aqueous coating composition.

HEHPC can be incorporated into the latex or formulated coating composition by any known means. Powdered HEHPC can be slurried into the liquid additive and stirred slowly into the latex or formulation, or an aqueous solution of the HEHPC can be prepared and incorporated into the composition. High viscosity cellulose ethers are difficult to disperse uniformly and are preferably incorporated slowly into the latex or aqueous medium while agitating.

The coating composition can include the usual formulation additives for paints and the like in addition to the latex and the pigment. Typically, formulation additives, such as stabilizers, extenders, coalescing aids, plasticizers, preservatives such as fungicides and other known additives. The use of said additives is not affected by the HEHPC employed in this invention.

The following examples are intended to illustrate the present invention and should not be construed to limit the scope thereof in any way. All parts and percentages are by weight unless otherwise indicated.

EXAMPLE

Cellulose ether Sample Nos. 1 and 2 and Comparative Sample Nos. A and B are prepared using a slurry reaction process using methyl ethyl ketone as the slurry solvent. A three gallon slurry reactor is charged with cellulose pulp, sufficient caustic to yield a caustic/cellulose ratio of about 0.40, propylene oxide and sufficient ethylene oxide to yield an ethylene oxide/cellulose ratio of about 0.23. The reactor is heated to 80° C. for 2 hours. The caustic is then neutralized with glacial acetic acid until the caustic/cellulose ratio is reduced to about 0.06. Additional ethylene oxide is added and the reactor heated to 90° C. until the reaction is completed. The amount of ethylene oxide used in the second stage of the reaction and the amount of propylene oxide employed are chosen such that the final product has the desired molar substitutions. The molar substitution of Samples No. 1 and 2, Comparative Samples A and B are as shown in Table I following. In addition, the molar substitutions of Comparative Samples C and D are indicated in Table I following.

TABLE I

| Sample No. | Cellulose Ether (1) | HEMS (2) | HPMS (3) | HPMS/HEMS (4) | Total MS (5) |
|---|---|---|---|---|---|
| 1 | HEHPC | 2.5 | 1.4 | 0.56 | 3.9 |
| 2 | HEHPC | 1.3 | 1.3 | 1.0 | 2.6 |
| A* | HEHPC | 2.0 | 0.6 | 0.3 | 2.6 |
| B* | HEHPC | 1.2 | 2.8 | 2.33 | 4.0 |
| C* | HPMC | — | 0.7–1.0 | N/A | — |

TABLE I-continued

| Sample No. | Cellulose Ether (1) | HEMS (2) | HPMS (3) | HPMS/ HEMS (4) | Total MS (5) |
|---|---|---|---|---|---|
| D* | HEC | ~2.5 | — | N/A | ~2.5 |

*Not an example of this invention.
(1) The type of cellulose ether is indicated where:
HEHPC represents hydroxyethyl hydroxypropyl cellulose, with the hydroxyethyl and hydroxypropyl molar substitution as indicated;
HPMC is a hydroxypropylmethyl cellulose having a hydroxypropyl molar substitution as indicated in the Table and a methoxy degree of substitution of 1.1–1.6;
HEC is Natrosol ® H4R hydroxyethyl cellulose sold by Hercules, Inc.
(2) Hydroxyethyl molar substitution.
(3) Hydroxypropyl molar substitution.
(4) The ratio of hydroxypropyl molar substitution to hydroxyethyl molar substitution.
(5) Total molar substitution.

HAZE POINT DETERMINATION

An aqueous solution containing 2 percent of cellulose ether Sample No. 1 is prepared. About 1½ inches of the cellulose ether solution is placed into a 22 × 175 mm test tube which is placed into a 400 ml beaker containing about 250 ml of water. The beaker is heated so that the temperature of the water in the beaker rises at a rate of about 1° C. every 5 minutes. A thermometer is placed inside the test tube with minimal agitation of the sample. As the beaker is heated, the temperature in which the cellulose ether solution becomes hazy is noted as the haze point of the cellulose ether. This procedure is repeated for Sample No. 2 and Sample Nos. A–D with the results as given in the following Table II.

ENZYME RESISTANCE EVALUATION

Enzyme resistance is evaluated using the separated enzyme test described in Glomski et al., U.S. Pat. No. 3,709,876, using an aqueous solution containing 1 percent of the cellulose ether as described in Table I hereinbefore. Solutions of cellulose ether (Sample Nos. 1–2 and A–D) are inoculated with an aqueous solution of the standard cellulose enzyme (Cellase 1000 from Wallerstein Co., Morton Grove, Ill.) at pH 7.0 and 25° C. The enzyme resistance is determined by measuring the aqueous solution viscosity 5, 15 and 30 minutes after being innoculated with the enzyme using a Brabender visco/amylograph or a Haake Rotovisco Meter (Gebrader Haake AG, West Berlin, West Germany). A small decrease in the viscosity of the solution indicates good resistance to bacterial degradation. Results of the enzyme resistance evaluation are as given in Table II following.

COLOR DEVELOPMENT EVALUATION

A paint formulation is prepared from the following ingredients:

| Ingredients | Lb/100 gal |
|---|---|
| Water | 93.7 |
| Dispersant (sodium salt of a polycarboxylic acid) | 7.9 |
| Surfactant (an octylphenoxy polyethoxy ethanol) | 0.7 |
| Propylene Glycol | 32 |
| Antimicrobial agent | 1.3 |
| TiO$_2$ | 275 |
| Dispersant (Sodium salt of a polycarboxylic acid) | 1.32 |
| Surfactant (a dioctyl sodium sulfosuccinate) | 0.34 |
| Propylene Glycol | 32 |
| Coalescent (glycol ether) | 25 |
| Rohm and Haas AC-490 semi-gloss Acrylic Latex | 590 |
| Thickener Solution | 79 |

Stock 3 percent aqueous solutions of the cellulose ether products described in Table I are prepared and used as the thickener in Paint Formulation Nos. 1–2 and A–D, respectively. Paint Formulation No. 1 is thoroughly mixed with a paddle stirrer for 30 minutes and five 50-part samples are taken and heated at 50° C. for 2 hours. To simulate tinting hot from the grinding mill, 1 part Aquablak "G" coloring is added to each preheated sample of the paint formulation with gentle mixing for 1 minute. A 7–10 mil (0.175–0.25 mm) coating (wet) is made on a paper chart with drawdown bar. After 1 minute, the paint is sheared with the fingertip at the intersection of the sealed and unsealed portions of the chart. The color difference between the sheared and unsheared areas is evaluated against standards rated 1 for perfect color compatibility to 10 for severe incompatibility. This procedure is repeated after cooling the paint formulations to room temperature. Paint Formulation Nos. 2 and A–D are tested in like manner. The results are given in Table II following.

TABLE II

| Paint Formulation No. | Cellulose (1) Ether Sample No. | Haze Point °C. | Color Development Room Temp. | Color Development 50° C. | Enzyme Resistance (2) 5 min | Enzyme Resistance (2) 15 min | Enzyme Resistance (2) 30 min |
|---|---|---|---|---|---|---|---|
| 1 | 1 | 88 | 3 | 5 | 23 | 28 | 31 |
| 2 | 2 | 76 | 2 | 4 | 48 | 57 | 61 |
| A* | A | >100 | 4 | 3 | 86 | 93 | 93 |
| B* | B | 63 | 7 | 10 | 54 | 57 | 64 |
| C* | C | 56 | 10 | 10 | 52 | 64 | 70 |
| D* | D | >100 | ND | 2 | ND | ND | 95 |

*Not an example of this invention.
ND Not done.
(1) Sample numbers correspond to Table I.
(2) Expressed as percent viscosity loss.

As can be seen from Table II, the test resistance to bacterial degradation is exhibited by Sample Nos. 1 and 2, the cellulose ethers of this invention. While Samples Nos. B and C exhibit acceptable resistance to bacterial degradation, their color development is poor and their haze points are low. Sample Nos. A and D exhibit good color development but poor resistance to bacterial degradation. Only Sample Nos. 1 and 2 combine the properties of good resistance to bacterial degradation, good color development and acceptable haze points.

What is claimed is:

1. An aqueous coating composition comprising (a) an aqueous dispersion of finely divided, water-insoluble polymer particles, (b) a pigment and (c) a hydroxyethyl hydroxypropyl cellulose ether having a thermal haze point of at least about 70° C., a gel point below 100° C., a total molar substitution of about 2.5 to 4.0 and a ratio of hydroxypropyl molar substitution to hydroxyethyl molar substitution of about 1:2 to 2:1 in an amount sufficient to impart the desired viscosity to said aqueous coating composition.

2. The composition of claim 1 wherein said cellulose ether has a total molar substitution of about at least 3.5.

3. The composition of claim 1 wherein the cellulose ether is employed in an amount in the range of from about 0.1 to about 3.0 percent of the total weight of the coating composition.

4. The composition of claim 1 wherein the cellulose ether has an HPMS/HEMS ratio of about 1:2 to about 1:1.

5. The composition of claim 1 wherein the cellulose ether has a 2 percent aqueous solution viscosity of about 50 to 250,000 cps.

6. The composition of claim 1 wherein the polymer of said aqueous dispersion is a polyacrylate.

7. The composition of claim 1 wherein the polymer of said aqueous dispersion is a styrene/butadiene copolymer.

8. The composition of claim 1 wherein the polymer of said aqueous dispersion if a polyvinyl acetate.

9. The composition of claim 1 wherein the polymer of said aqueous dispersion is a copolymer of vinylacetate and vinyl halide or vinylidene halide.

10. The composition of claim 1 wherein the polymer of said aqueous dispersion is a copolymer of a vinyl halide or vinylidene halide and acrylic acid or methacrylic acid.

* * * * *